US 9,828,886 B1

(12) United States Patent
Harmon, Sr.

(10) Patent No.: US 9,828,886 B1
(45) Date of Patent: Nov. 28, 2017

(54) HIGH EFFICIENCY STEAM ENGINE AND STEAM EXPANDER

(71) Applicant: Thermal Power Recovery LLC, Mahtomedi, MN (US)

(72) Inventor: James V. Harmon, Sr., Mahtomedi, MN (US)

(73) Assignee: Thermal Power Recovery, LLC, Mahtomedi, MN (US)

( * ) Notice: Subject to any disclaimer, the term of this patent is extended or adjusted under 35 U.S.C. 154(b) by 0 days.

(21) Appl. No.: 15/077,576

(22) Filed: Mar. 22, 2016

Related U.S. Application Data

(63) Continuation of application No. 13/532,853, filed on Jun. 26, 2012, now Pat. No. 9,316,130, which is a
(Continued)

(51) Int. Cl.
*F01K 23/06* (2006.01)
*F01B 29/04* (2006.01)
(Continued)

(52) U.S. Cl.
CPC ............... *F01K 21/02* (2013.01); *F01B 9/02* (2013.01); *F01B 31/28* (2013.01); *F01B 2250/001* (2013.01)

(58) Field of Classification Search
CPC .. F01K 21/02; F01B 9/02; F01B 31/28; F01B 2250/001
(Continued)

(56) References Cited

U.S. PATENT DOCUMENTS 51,081 A    11/1865  Pike
175,485 A    3/1876  Miracle
(Continued)

FOREIGN PATENT DOCUMENTS

DE    3437151 A1    4/1986
GB       25356       0/1911
(Continued)

OTHER PUBLICATIONS

John R. Allen et al., Heat Engines, McGraw Hill Book Company, 1925, pp. 205-207; pp. 213-215.
(Continued)

*Primary Examiner* — Thai Ba Trieu
(74) *Attorney, Agent, or Firm* — Thomas J. Nikolai; Nikolai & Mersereau, P.A.

(57) ABSTRACT

A high efficiency steam engine or steam expander includes a cylinder, cylinder head and piston in which cylinder clearance volume is zero or nearly zero together with a negligible amount of compression such that any pressure in the cylinder clearance volume just before the power stroke is as low as ambient pressure or condenser pressure to provide superior thermal efficiency in a compact compound engine having a high pressure expansion chamber within the piston and low pressure chamber in the cylinder. The inlet valve is opened slightly by piston movement and a steam assist force then drives it to its fully open position. Steam passes from the high pressure chamber to the low pressure chamber through a transfer valve located in the head of the piston and steam is released through an automatic exhaust valve in the cylinder head.

33 Claims, 7 Drawing Sheets

Related U.S. Application Data continuation-in-part of application No. 12/959,025, filed on Dec. 2, 2010, now Pat. No. 8,448,440, which is a continuation-in-part of application No. 12/844,607, filed on Jul. 27, 2010, now Pat. No. 8,661,817, and a continuation-in-part of application No. 12/539,987, filed on Aug. 12, 2009, now Pat. No. 8,061,140, which is a continuation-in-part of application No. 12/492,773, filed on Jun. 26, 2009, now abandoned, which is a continuation-in-part of application No. 12/387,113, filed on Apr. 28, 2009, now Pat. No. 8,109,097, which is a continuation-in-part of application No. 12/075,042, filed on Mar. 7, 2008, now Pat. No. 7,997,080.

(60) Provisional application No. 61/320,959, filed on Apr. 5, 2010, provisional application No. 61/309,640, filed on Mar. 2, 2010, provisional application No. 60/905,732, filed on Mar. 7, 2007.

(51) Int. Cl.
*F01L 25/04* (2006.01)
*F01K 21/02* (2006.01)
*F01B 9/02* (2006.01)
*F01B 31/28* (2006.01)

(58) Field of Classification Search
USPC .......... 60/614–620, 670, 712, 643, 676; 123/50 R, 520, 73 F, 73 FA; 91/22, 25, 91/241, 242, 152
See application file for complete search history.

(56) References Cited

U.S. PATENT DOCUMENTS

| | | |
|---|---|---|
| 465,241 A | 12/1891 | Cowles |
| 606,739 A | 7/1898 | Rothgery |
| 678,806 A | 7/1901 | Whitfield |
| 690,620 A | 1/1902 | Schneider |
| 694,547 A | 3/1902 | Hood |
| 716,115 A | 12/1902 | Schneider |
| 753,647 A | 3/1904 | Thorson |
| 832,635 A | 10/1906 | Svenson |
| 845,622 A | 2/1907 | Du Shane |
| 863,545 A | 8/1907 | McLachlan |
| 1,011,516 A | 12/1911 | Stappen |
| 1,027,380 A | 5/1912 | Fryer |
| 1,128,125 A | 2/1915 | Fryer |
| 1,169,672 A | 1/1916 | Palm |
| 1,210,649 A | 1/1917 | Holley |
| 1,217,788 A | 2/1917 | Liedtke |
| 1,324,183 A | 12/1919 | Still |
| 1,331,665 A | 2/1920 | Ohborg |
| 1,332,633 A | 3/1920 | Parrish |
| 1,359,988 A | 11/1920 | Hansen |
| 1,427,395 A | 8/1922 | Kaschtofsky |
| 1,489,291 A | 4/1924 | Tuerk |
| 1,496,839 A | 6/1924 | Bohan et al. |
| 1,502,918 A | 7/1924 | Scott |
| 1,517,372 A | 12/1924 | Martineau |
| 1,542,578 A | 6/1925 | Pool |
| 1,601,995 A | 10/1926 | Butler et al. |
| 1,629,677 A | 5/1927 | Bull |
| 1,630,841 A | 5/1927 | Fusch |
| 1,617,838 A | 5/1928 | Norberg |
| 1,671,838 A | 5/1928 | Norberg |
| 1,732,011 A | 10/1929 | Gouirand |
| 1,802,828 A | 4/1931 | Perrenoud |
| 1,913,251 A | 6/1933 | Smith |
| 1,953,674 A * | 4/1934 | Dean ............... F01B 17/04 92/144 |
| 1,965,569 A | 7/1934 | Anderson |
| 1,987,003 A | 1/1935 | Dole |
| 2,000,108 A | 5/1935 | Tucker |
| 2,040,453 A | 5/1936 | Weber |
| 2,057,075 A | 10/1936 | Wuehr |
| 2,058,485 A * | 10/1936 | Miller ............... F02F 3/20 92/152 |
| 2,063,970 A | 12/1936 | Young |
| 2,138,351 A | 11/1938 | McGonigall |
| 2,341,348 A | 3/1940 | Welby |
| 2,196,979 A | 4/1940 | Campbell |
| 2,196,980 A | 4/1940 | Campbell |
| 2,269,106 A | 1/1942 | Hoffman |
| 2,295,962 A * | 9/1942 | Mueller ............... F01B 17/04 91/152 |
| 2,309,968 A | 2/1943 | Marburg |
| 2,402,699 A | 6/1946 | Williams |
| 2,560,449 A | 7/1951 | Kahr |
| 2,572,652 A | 10/1951 | Mueller |
| 2,604,079 A | 7/1952 | Ray |
| 2,632,464 A | 3/1953 | Kerr |
| 2,649,078 A | 8/1953 | Kelly |
| 2,671,434 A | 3/1954 | Schmiedeskamp |
| 2,730,996 A | 1/1956 | Doble |
| 2,943,608 A | 7/1960 | Williams |
| 2,957,462 A | 10/1960 | Clark |
| 3,033,181 A | 5/1962 | Barnes et al. |
| 3,137,211 A | 6/1964 | Grinnell, Jr. |
| 3,200,798 A | 8/1965 | Mansfield |
| 3,216,329 A | 11/1965 | Peterson |
| 3,279,326 A | 10/1966 | Harvey |
| 3,397,619 A | 8/1968 | Sturtevant |
| 3,489,162 A | 1/1970 | Meynell |
| 3,493,003 A | 2/1970 | Peoples |
| 3,527,141 A | 9/1970 | Peoples |
| 3,603,344 A | 9/1971 | Stampfli |
| 3,609,061 A | 9/1971 | Peoples |
| 3,638,533 A | 2/1972 | Sheridan |
| 3,645,169 A | 2/1972 | Clark |
| 3,650,295 A | 3/1972 | Smith |
| 3,653,297 A | 4/1972 | Peoples |
| 3,662,553 A | 5/1972 | Hodgkinson |
| 3,719,322 A | 3/1973 | Gifford |
| 3,759,141 A | 9/1973 | Zibrun |
| 3,779,005 A * | 12/1973 | Sorensen ............... F02G 5/02 60/617 |
| 3,877,479 A | 4/1975 | Miyawaki |
| 3,882,833 A | 5/1975 | Longstaff |
| 3,908,686 A | 9/1975 | Carter et al. |
| 3,921,404 A | 11/1975 | Mason |
| 3,990,238 A | 11/1976 | Bailey |
| 3,995,531 A | 12/1976 | Zibrun |
| 4,023,537 A | 5/1977 | Carter, Sr. et al. |
| 4,050,357 A | 9/1977 | Carter, Sr. et al. |
| 4,077,214 A | 3/1978 | Burke et al. |
| 4,079,586 A | 3/1978 | Kincaid, Jr. |
| 4,166,410 A | 9/1979 | Schlosser |
| 4,168,655 A | 9/1979 | Kitrilakis |
| 4,201,058 A | 5/1980 | Vaughan |
| 4,300,353 A | 11/1981 | Ridgway |
| 4,362,132 A | 12/1982 | Neuman |
| 4,377,934 A | 3/1983 | Marshall |
| 4,425,763 A | 1/1984 | Porta et al. |
| 4,491,057 A | 1/1985 | Ziegler |
| 4,509,464 A | 4/1985 | Hansen |
| 4,561,256 A | 12/1985 | Molignoni |
| 4,590,766 A | 5/1986 | Striebich |
| 4,655,175 A * | 4/1987 | Leonard ............... F02B 47/02 123/25 C |
| 4,706,462 A | 11/1987 | Soltermack |
| 4,724,800 A | 2/1988 | Wood |
| 4,747,271 A | 5/1988 | Fischer |
| 4,785,631 A | 11/1988 | Striebich |
| 4,829,947 A | 5/1989 | Lequesne |
| 4,864,826 A | 9/1989 | Lagow |
| 5,121,607 A | 6/1992 | George, Jr. |
| 5,385,211 A | 1/1995 | Carroll |
| 5,657,962 A | 8/1997 | Neron et al. |
| 6,095,100 A | 8/2000 | Hughes |
| 6,220,210 B1 | 4/2001 | Kobayashi |

(56) References Cited

U.S. PATENT DOCUMENTS

| | | |
|---|---|---|
| 6,237,550 B1 | 5/2001 | Hatano |
| 6,443,111 B1 | 9/2002 | LaDow |
| 6,457,309 B1 | 10/2002 | Firey |
| 6,745,794 B2 | 6/2004 | Gajewski |
| 6,834,503 B2 | 12/2004 | Freymann |
| 6,895,756 B2 | 5/2005 | Schmotolocha |
| RE38,750 E | 7/2005 | Weaver |
| 7,056,251 B2 | 6/2006 | Ibaraki |
| 7,104,063 B2 | 9/2006 | Clemens |
| 7,267,113 B2 | 9/2007 | Tsuge et al. |
| 7,536,943 B2 | 5/2009 | Pritchard |
| 7,841,309 B2 | 11/2010 | Grundl |
| 7,856,822 B2 | 12/2010 | Schoell |
| 7,992,386 B2 | 8/2011 | Schoell |
| 7,997,080 B2 | 8/2011 | Harmon, Sr. |
| 8,061,140 B2 | 11/2011 | Harmon, Sr. |
| 8,109,097 B2 | 2/2012 | Harmon, Sr. |
| 8,448,440 B2 | 5/2013 | Peoples et al. |
| 8,661,817 B2 | 3/2014 | Harmon, Sr. et al. |
| 8,807,012 B1 | 8/2014 | Bennett et al. |
| 2003/0226603 A1 | 12/2003 | Gajewski |
| 2005/0263189 A1 | 12/2005 | Nakamura |
| 2007/0234977 A1 * | 10/2007 | Thorpe .................. F02B 47/02 123/25 C |
| 2008/0216480 A1 | 9/2008 | Harmon |
| 2009/0205338 A1 | 8/2009 | Harmon, Sr. et al. |
| 2009/0293480 A1 | 12/2009 | Harmon |
| 2010/0043896 A1 | 2/2010 | Shock et al. |
| 2010/0058751 A1 | 3/2010 | Chavez |
| 2010/0095662 A1 | 4/2010 | Chavez |
| 2010/0300100 A1 | 12/2010 | Harmon |
| 2011/0083434 A1 | 4/2011 | Peoples |
| 2012/0192561 A1 | 8/2012 | Coates |
| 2012/0324889 A1 | 12/2012 | Petitjean et al. |

FOREIGN PATENT DOCUMENTS

| | | |
|---|---|---|
| GB | 28472 | 0/1913 |
| GB | 125395 | 4/1919 |
| GB | 130621 | 8/1919 |
| GB | 1750 | 1/2012 |
| JP | 59099016 A * | 6/1984 .............. F01L 19/00 |
| JP | 06519061 A | 6/1994 |
| WO | WO 0231319 | 4/2002 |
| WO | WO 03050402 | 6/2003 |

OTHER PUBLICATIONS

Harry R. Solberg, et al, Elementary Heat Power, Second Edition, John Wiley & Sons, Inc., Copyright 1946, 1952, pp. 150-154; pp. 448-450; pp. 465-469.

Frank D. Graham, Audels Engineers & Mechanics Guide 2, Theo. Audel & Company, Copyright 1921, 1927, 1938, reprinted 1943, pp. 593 & 606.

Jerry Peoples, The Lore of Steam Automotive Power, Copyright 2007, privately published by Jerry A. Peoples, May 2007, pp. 47-60 & 90-118. Figures 9-8 to 9-12.

J.R. Allen and J.A. Bursley, Heat Engines,1925 Third Edition, pp. 210 and 211, McGraw Hill, New York, U.S.

Jerry Peoples, Gewgaws of Production Steam, The Steam Automobile Bulletin, Sep.-Oct. 2006, vol. 20, No. 5, pp. 7-13.

J.V. Haywood, Internal Combustion Engines, McGraw-Hill Book Co. 1988 pp. 657-659.

D.A. Low, Heat Engines, Longmans, Green & Co. 1949, pp. 246-248.

Marks, et. al., Marks' Standard Handbook for Mechanical Engineers, McGraw-Hill, Inc. 9th ed. 1987, pp. 9-36 to 9-38.

An Assessment of the Technology of Rankine Engines for Automobiles. Division of Transportation Energy Conservation, U.S. Energy Research and Development Administration, Apr. 1977, pp. 22-24.

Bill Cartland, Easy Starting Bash Valve, Steam Automobile Club of America, Inc. Technical Report No. 120, 1993, one page.

Ronald Loving, Low NOx Thermal Oxidizers, Steam Automobile Bulletin, vol. 20 No. 5, Sep.-Oct. 2006, pp. 28-30.

Tom Kimmel, The Leslie Engine, Steam Automobile Bulletin, vol. 21 No. 5, Sep.-Oct. 2007, pp. 14-16.

D.A. Arias, et. al., Theoretical Analysis of Waste Heat Recovery From and Internal Combustion Engine in a Hybrid Vehicle, SAE Technical Paper, 2006-1-1605, Apr. 3-6, 2006.

S.S. Miner, Developments in Automotive Steam Power Plants, SAE Technical Paper, No. 690043, Jan. 13-17, 1969.

BMW's Hybrid Vision: Gasoline and Steam, Popular Science Magazine, Mar. 2006, p. 22 (one page).

An Assessment of the Technology of Rankine Engines for Automobiles Div. of Transportation Energy Conservation, U.S. Energy Research & Develop. Admin., 04/77, pp. 43-54.

The listed Foreign and non-patent publications were previously provided in an IDS in U.S. Appl. No. 12/075,042, filed Mar. 7, 2008 and Ref. 13 was provided in an IDS for U.S. Appl. No. 12/539,987.

* cited by examiner

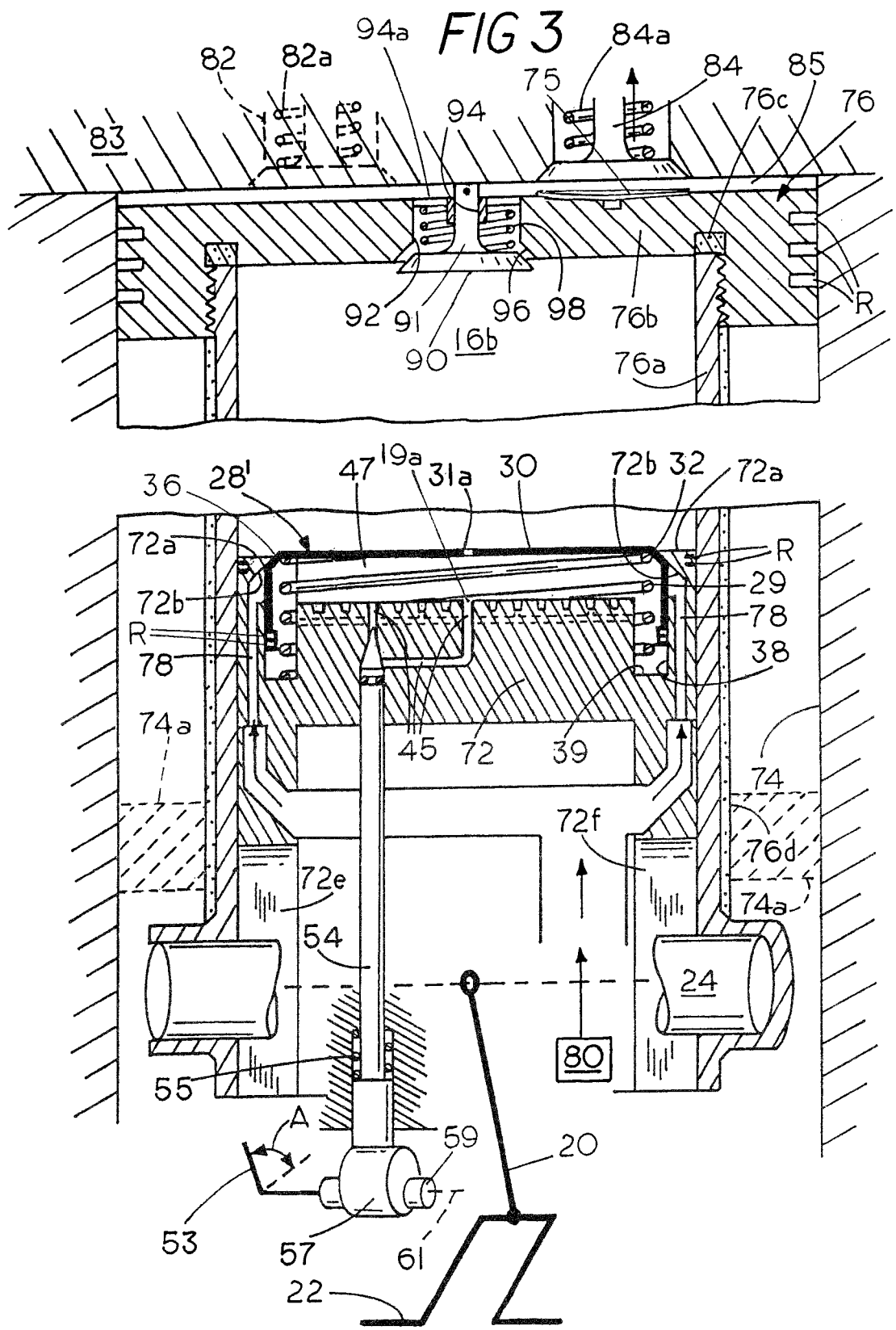

HIGH EFFICIENCY STEAM ENGINE AND STEAM EXPANDER

I. CROSS REFERENCE TO RELATED APPLICATIONS

The present application is a continuation-in-part of application Ser. No. 13/532,853 filed Jun. 26, 2012, now U.S. Pat. No. 9,316,130 which is in turn a continuation-in-part of Ser. No. 12/959,025, filed Dec. 2, 2010, now U.S. Pat. No. 8,448,440 which in turn is a continuation-in-part of application Ser. No. 12/539,987, filed Aug. 12, 2009, now U.S. Pat. No. 8,061,140 which in turn is a continuation-in-part of application Ser. No. 12/492,773, filed Jun. 26, 2009 (now abandoned), a continuation-in-part of copending application Ser. No. 12/844,607, filed Jul. 27, 2010, now U.S. Pat. No. 8,661,817 a continuation-in-part of Ser. No. 12/387,113, filed Apr. 28, 2009, now U.S. Pat. No. 8,109,097 and Ser. No. 12/075,042, filed Mar. 7, 2008, now U.S. Pat. No. 7,997,080.

The applicants also claim the benefit of the following provisional applications: 61/309,640, filed Mar. 2, 2010; and 61/320,959, filed Apr. 5, 2010 all of which are incorporated herein by reference.

II. FIELD OF THE INVENTION

This invention relates to steam engines as well as steam expanders that can be used as a part of a dual cycle engine for recovering waste heat, and to a method and apparatus for achieving higher efficiency in such engines and expanders.

III. BACKGROUND OF THE INVENTION

Although steam engines can use a variety of liquid and lower cost solid fuels and inherently produce few toxic emissions, the thermal efficiency of current steam engines is significantly below that of internal combustion engines.

To achieve greater efficiency, Applicant's prior application Ser. No. 12/959,025, filed Dec. 2, 2010, now U.S. Pat. No. 8,448,440 provides a new Rankine operating cycle which can be referred to as a "zero clearance with zero compression" cycle or a Z-Z cycle in which efficiency was improved in part by arranging the clearance between the piston and cylinder head to approach zero but provision must be made to keep the piston from hitting the head. Consequently, a near zero or quasi-zero clearance was used. While minimal compression is typically provided in both the present and the prior application, for various reasons some compression may be present during the last fraction of an inch before TDC due, for example, to the dimensions of the valves and parts used to operate valves.

U.S. Pat. No. 4,168,655 describes an engine with an automatic inlet valve in which the force used to close valve is overcome by knocking it ballistically off its seat. However, this produces a high impact stresses in the valve and piston. In addition to eliminating the high impact stress of U.S. Pat. No. 4,168,655, the piston of the present invention can be connected directly to a wrist pin and connecting rod if desired and does not need an external valve structure that adds substantially to the clearance volume. The prior patent also employs steam recompression which makes zero compression with zero clearance operation impossible. In addition routine variations in speed and pressure would interfere with an attempt to provide repeatable cutoff control. It is also current practice, for example as in U.S. Pat. Nos. 7,856,822 and 7,992,386 to admit steam through inlet passages or ports that extend outwardly from the cylinder and therefore create a substantial clearance volume.

OBJECTS AND ADVANTAGES OF THE INVENTION

One major objective of the present invention is to find a way to provide a steam admission method and apparatus that concurrently achieves inlet valve actuation with no clearance at all or almost no clearance between the piston and the end of the cylinder as well as eliminating connecting ducts or ports while simultaneously creating little, if any, compression in the cylinder between the piston and cylinder head at the end of the exhaust stroke such that the clearance is actually zero or approximates zero and, in this way, provide an engine constructed and operated such that the actual operating characteristics achieve maximum thermal efficiency in accordance with the zero clearance with zero compression operating cycle described herein and in Applicant's foregoing application Ser. No. 12/959,025, now U.S. Pat. No. 8,448,440 wherein an indicated thermal efficiency which is better than that of the best prior operating cycle known, is given by the formula $$\eta_{ZZ} = \text{Cycle Efficiency} = \frac{\text{Work}_{NET}}{m\Delta h} = \frac{P_T}{\rho_s x \Delta h}\left[\frac{xn - x^n}{n-1} - \frac{P_A}{P_T}\right]$$

with terms defined as follows:
$\eta_{ZZ}$—Thermal efficiency of zero clearance zero compression cycle
$\rho_S$—density of supply steam
$P_T$—throttle pressure
$P_A$—condenser pressure
x—cutoff=$V_O/V_R$
$\Delta h$—enthalpy change in steam generator
n—polytropic exponent of expansion, e.g. 1.2
m—steam mass at cutoff
$V_O$—cylinder volume at cutoff
$V_R$—cylinder volume at release It is a general object of the invention to provide a new Rankine (steam) operating cycle that makes possible a marked improvement in overall operating efficiency for a steam engine or expander.

Another object is to find a practical way to provide virtually no compression and at the same time provide and utilize a zero clearance with no space at all between the end of the cylinder and the piston at the end of the exhaust stroke for improving thermal efficiency of a Rankine cycle.

Yet another object of this invention is to provide a way to construct an engine that is effective in accurately timing the actuation of steam intake and exhaust from a steam expansion chamber constructed with virtually no connecting ducts or ports that contribute to the clearance volume.

Another object is to find a way to exhaust substantially all of the steam from a minute space or no clearance space at all while at virtually the same instant admitting a fresh charge without impacting thermal efficiency from an engineering viewpoint as a result of losing admission mass directly to the exhaust outlet.

Another object is to provide an automatic steam inlet valve with simple ways of setting or varying the cutoff of steam into the steam expansion chamber during each power stroke while the engine is in operation.

Yet another object is to provide an inlet valve that shuts and is held shut reliably but is relatively easy to open with little impact stress and in which the opening force required is independent of the pressure of steam being admitted.

An additional object is to provide steam power to assist in opening the inlet valve and holding it open for a predetermined fraction of each power stroke.

Yet another object is to provide a more efficient double expansion, i.e., compound steam engine.

Still another object is to provide a steam engine having a steam inlet valve that is opened almost instantly by steam supplied to the valve at a given pressure, then remains open for an interval that can be regulated and is then closed by steam supplied to the valve at the same pressure used for opening the valve.

These and other more detailed and specific objects and advantages of the present invention will be better understood by reference to the following figures and detailed description which illustrate by way of example but a few of the various forms of the invention within the scope of the appended claims.

BRIEF DESCRIPTION OF THE DRAWINGS

FIG. 3 is a diagrammatic vertical sectional view of one form of the invention that employs the valve body of FIG. 2.

SUMMARY OF THE INVENTION

One aspect of the invention results from discovery of a major advance that can be achieved by providing a piston clearance that not only approximates zero but is actually zero, i.e., has no clearance at all together with a negligible amount or no compression, such that there is no pressure or clearance volume. Pressure can approximate ambient pressure or condenser pressure as the case may be at the end of the return stroke when the clearance is actually zero throughout most of the cylinder, preferably over 75% of its diameter. These two provisions; the elimination of clearance and compression working together simultaneously makes it possible in an actual engine to achieve higher thermal efficiency than previously provided in a Rankine cycle engine. Moreover, by contrast to U.S. Pat. No. 4,168,655, the present invention provides a way to operate a steam admission valve assembly with low valve impact stress and a low valve lifting force requirement that is independent of steam supply pressure. Applicants' inlet valve can also be opened either automatically responsive to piston contact or by means of a cam shaft and cam or electrically by means of a solenoid that produces an intermittent magnetic field for operating one or more valves with further efficiency. A biphasic exhaust system is also described in which a piston operated automatic valve opens to exhaust steam in a primary phase, and in a later secondary phase a supplemental, normally open exhaust valve permits virtually all residual steam that remains after a primary exhaust phase to be exhausted through the approximate end of the piston return stroke after which it is closed by the piston or by a cam and finally held closed during the power stroke by a fresh charge of steam injected into the clearance volume through the steam admission valve. In some embodiments, the automatic exhaust valve is eliminated and only the supplemental exhaust valve is used.

The invention can employ any of various known working fluids as well as water such as hydrocarbons, monohydric alcohols, refrigerants, halogenated hydrocarbons and the like. The term "steam" is therefore used broadly herein with reference to working fluid or components such as "steam" valves to include these and other fluids as well as water substance held under supercritical conditions of heat and pressure to prevent vaporization. In the present invention, water substance under supercritical conditions can be pumped, passed through valves, etc. and will vaporize explosively when released.

DETAILED DESCRIPTION OF THE PREFERRED EMBODIMENTS

Figure 1:
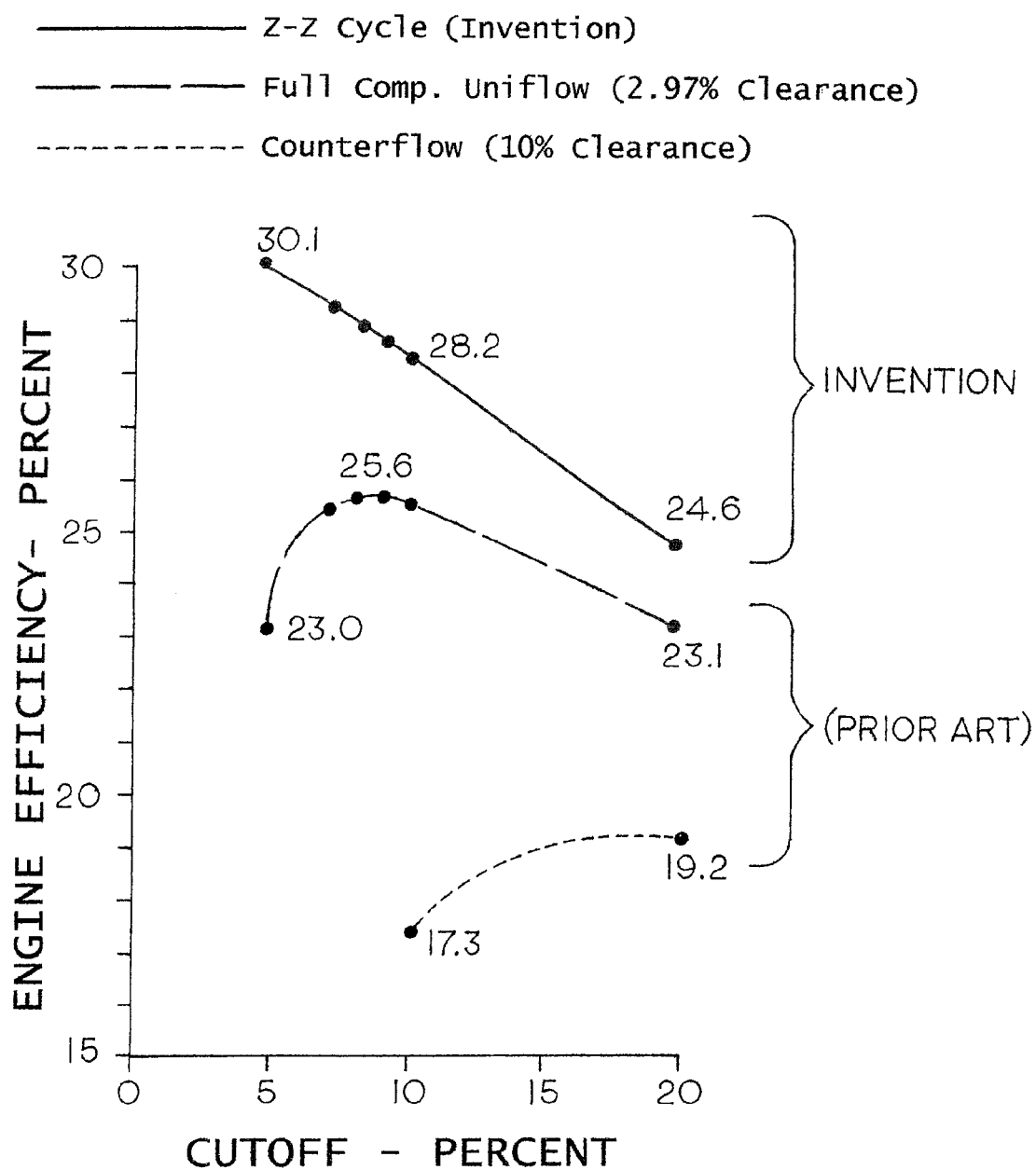
FIG. 1 is a graphic comparison of the indicated thermal efficiency performance of a counterflow engine, a high compression uniflow engine and the present invention.

The invention provides the capacity for greater thermal efficiency in an actual engine than prior Rankine cycles as will be further described with reference to FIG. 1. It was first recognized by Watt that the admission of steam must be cut off early in the power stroke to enhance engine efficiency by enabling expansion work to be performed after the admission valve closes. Consequently, the ability to achieve good efficiency early in each cycle is especially important, and the present invention is surprisingly far more efficient than prior cycles near the beginning of each cycle when an early cutoff is used. In FIG. 1, the indicated thermal efficiency of each engine type is calculated for various cutoff values between about 5% and 20% of the power stroke utilizing well known thermodynamic relationships assuming steam at 1000° F. and 1000 psi as also described in applicant's prior application of Dec. 2, 2010, Ser. No. 12/959,025, which is incorporated herein by reference. The comparison in FIG. 1 between the indicated efficiency of the z-z-cycle described in this application and the most efficient steam engine known; the high compression uniflow engine cycle (center curve) shows that at a cutoff of 9%, the efficiency of the invention is about 11% improved over the uniflow efficiency. However at a cutoff of 7%, it is about 16% improved, and remarkably at a cutoff of 5%, it is about 30% improved above the efficiency of the best steam cycle known. It will be noticed in FIG. 1 that at reducing cutoff levels, while efficiency of the invention improves, that of the prior art worsens.

Refer now to the remaining figures wherein the same numbers have reference to corresponding parts in the various views.

It was recognized by Watt that the admission of steam must be cut off early in the power stroke to enhance engine efficiency by enabling expansion work to be performed after the admission valve closes. Consequently, the ability to achieve good efficiency when an early cutoff is provided is especially important, and the present invention is surprisingly far more efficient than prior cycles when an early cutoff is used. In FIG. 1, the indicated thermal efficiency of each engine type is calculated for various cutoff values between about 5% and 20% of the power stroke utilizing well known thermodynamic relationships assuming steam at 1000° F. and 1000 psi as also described in applicant's prior application of Dec. 2, 2010, Ser. No. 12/959,025, which is incorporated herein by reference. The comparison in FIG. 1 between the indicated efficiency of the z-z-cycle described in this application and the most efficient steam engine known; the high compression uniflow engine cycle (center curve) shows that at a cutoff of 9%, the efficiency of the invention is about 11% improved over the uniflow efficiency. However at a cutoff of 7%, it is about 16% improved, and remarkably at a cutoff of 5%, it is about 30% improved above the efficiency of the best steam cycle known. It will be noticed in FIG. 1 that at reducing cutoff levels, while efficiency of the invention improves, that of the prior art worsens.

Figure 2:
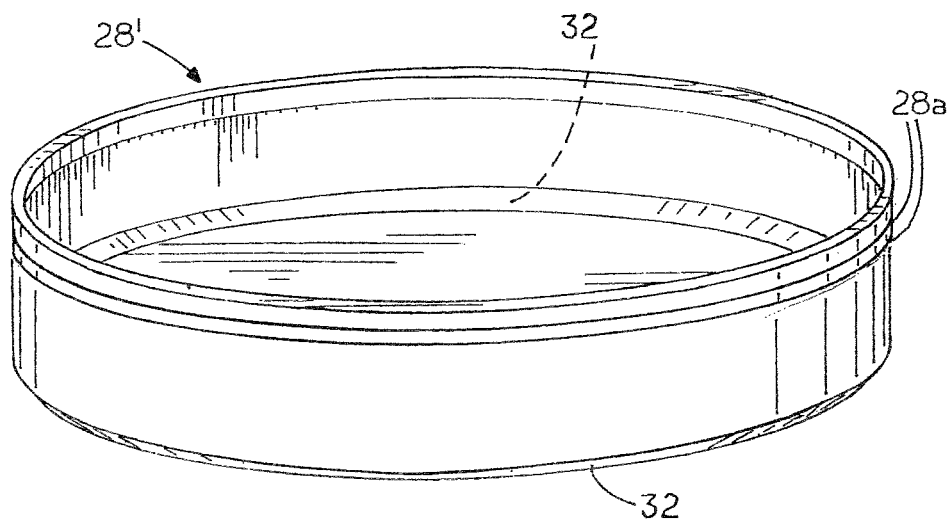
FIG. 2 is a perspective view of an inlet valve body in accordance with one preferred form of the invention.

FIG. 3 shows an automatic steam inlet valve body 28' of the invention and a piston 76 as a part of a double expansion, i.e., compound steam engine having high and low pressure chambers in a single cylinder 74 with a working piston 76 having an enlarged head portion 76b, a coaxial sleeve 76a of a smaller diameter, a gasket 76c and fiber reinforced insulating layer 76d wound onto sleeve 76a. The piston 76 is operatively coupled to the crankshaft 22, e.g., by a connecting rod 20. In FIG. 3, piston 76 is slideably and sealingly mounted within the cylinder 74 as well as over an inward cylinder head 72 which is provided near its free end with compression rings R. The piston 76 provides power strokes in both directions along the axis of the cylinder. FIG. 2 illustrates the steam inlet valve body 28' of FIGS. 3-7 in which the center and the face of wall 30 is substantially flat. The steam inlet valve body 28' normally closed by spring 29 is a poppet piston (also shown in FIG. 2) with an annular tapered valve closure surface 32 at its free end which forms an end seal or poppet seal on a seat 72b communicating with a port 36 between the cylinder head 83 and the steam expansion chamber 16b. The inlet valve body 28' which can be seen best in FIG. 2 functions as a piston shaped somewhat like a cake pan, i.e., patelliform in shape with a tubular or cylindrical sidewall aligned axially with the bore 38 in the cylinder head for allowing the valve body 28' to reciprocate therein during operation. The surface 30 of valve body 28' or piston head 76 or both can be grooved or embossed as shown in Applicant's prior application Ser. No. 13/532,853, now U.S. Pat. No. 9,316,130 FIG. 2D to give the steam access for preventing the contacting surfaces from tending to resist separation. The piston 76 is shaped somewhat like a mushroom with an enlarged head 76b that can be formed, for example, from an aluminum alloy having slots for compression rings R and an axially extending sleeve 76a of a smaller diameter than the head 76b rigidly secured to the head 76b, for example, by screw threads sealed by flexible fiber packing 76c. The sleeve 76a can be iron or steel preferably encased in a reinforcing a wrap 76d formed from a continuous filament winding such as carbon, glass or wire preferably bonded together in a suitable matrix, such as plastic or a ceramic. Bearings are provided at the lower end of the sleeve 76a to hold the ends of wrist pin 24.

The piston 76 of FIG. 3 has a steam transfer valve 90 comprising a mushroom-shaped poppet valve mounted to reciprocate in a transfer port 92 extending through the piston head 76b. The stem of the transfer valve 90 is slideably mounted in a guide 94 and is yieldably biased inwardly off of valve seat 96 by a compression spring 98 that is mounted between the head of valve 90 and radial struts 94a that support the guide 94 in port 92. When valve 90 is seated, the free upper end of the stem extends up a short distance above the top of the piston 76, e.g., 0.190 inch so that when the piston approaches outer cylinder head 83, contact between the tip of the valve stem and the outer cylinder head 83 opens the valve 90. As the piston descends after reaching TDC, spring 98 then continues to hold valve 90 open. Proximate TDC, the top of the piston contacts steam exhaust valve 84 normally held open by spring 84a, sliding it outwardly to the closed position as a low pressure steam expansion chamber 85 located between the piston 76 and the head 83 is reduced to a minimum volume with a final cylinder clearance that is sufficient to prevent contact, e.g., 0.020 inch clearance. A spring 75 such as a Belleville spring can be secured to piston head 76b to help close valve 84 and hold it in a closed position slightly after TDC. To minimize heat loss from the inner wall of cylinder 74, its diameter can be reduced at 74a to form a sliding seal on the outer wall of sleeve 76a.

The working piston 76 in FIG. 3 thus functions as a part of a compound double expansion steam engine with the high pressure expansion chamber 16b within the piston between the inward head 72 and the working piston. The low pressure steam expansion chamber 85 is between the piston 76 and the outer head 83. In the example shown, a steam expansion ratio of about 2.5/1 is provided. If desired, a second spring biased inwardly opening valve 82 having a spring 82a can be provided to operate in the same manner as valve 84 for further reducing exhaust pressure in chamber 85 as the piston moves outwardly.

Steam inlet valve 28' (also shown in FIG. 2) has a small aperture 31a at its center aligned with the outward mouth of the duct 45 which in this embodiment communicates through the center of an inward cylinder head 72 to supply steam to a metering needle 54. When open, the inner surface of valve 28' abuts against a stop surface 19a surrounding the mouth of the duct 45 thereby forming a seal when the surfaces make contact as valve 28' is opened. This enables steam to pass through aperture 31a, then through duct 45 into a timing chamber 47 under the control, i.e. selected setting of metering needle valve 54 to establish the steam cutoff as determined by the time period for the pressure differential across valve 28' to fall sufficiently to allow the spring 29 to close valve 28' whereupon valve 28' will almost instantly close by contacting valve seat 72b. The steam cutoff is either fixed or controlled, e.g. by cam 57 to optimize the efficiency of the engine or, alternatively, to provide more power when the steam cutoff is increased as described in Applicant's prior U.S. Pat. No. 8,448,440, which is incorporated herein by reference.

The piston 76 of FIG. 3 has a mushroom shape with an enlarged head 76b at an outer end supporting circumferentially extending piston compression rings R and a concentric inwardly extending cylindrical sleeve portion 76a of a smaller outside diameter than the piston head that is secured to the piston head as shown at its outer end and extends axially toward the crankshaft to hold the high pressure steam in expansion chamber 16b between the piston head 76b and the fixed inward cylinder head 72.

During operation of the engine of FIG. 3, as the piston descends, transfer valve 90 is closed when it makes contact with valve 28'. Spring 98 is rated to allow transfer valve 90 to close before steam inlet valve 28' can open. As the valve 28' begins to open, the force of the injected high pressure steam on tapered closure surface 32 and then on its outer surface 30 will almost instantly drive it to a fully open position with its inner surface and the aperture 31a sealed around the mouth of duct 45 while abutting against the stop surface 19a.

The high pressure steam at, say, 750 psia is almost instantly injected from steam supply 80 through twelve circumferentially spaced ducts 78 past the seat 72*b* of valve 28' surrounded by a ring portion 72*a* of cylinder head 72 into high pressure chamber 16*b* as soon as the inner surface of the piston 76 and the valve 90 contact the entire outer face or end wall 30 thereby establishing a zero clearance in the nascent high pressure expansion chamber 16*b* with the piston 76 located proximate the BDC position just before lifting valve 28' off its seat. The closure of valve 90 just as valve 28' opens assures that there is zero steam compression in the cylinder before steam is injected. As the piston changes direction and begins to rise, steam in high pressure chamber 16*b* will remain at supply pressure until cutoff results from the seating of inlet valve 28' under the control of needle valve 54 which causes steam to flow at a controlled rate through the aperture 31*a* then through the ducts 45 leading from the chamber 16*b* into the chamber 47 until axial steam pressure forces across valve 28' are sufficiently balanced to allow spring 29 to again close valve 28'. For the remainder of the outward piston stroke, the steam in high pressure chamber 16*b* expansion work as its volume increases while keeping transfer valve 90 shut.

Near the end of the outward stroke as the piston approaches the cylinder head 83 proximate the TDC position, contact between the stem 91 of valve 90 and the cylinder head 83 will open valve 90 allowing the high pressure steam in chamber 16*b* to enter the potentially greater volume of the low pressure chamber 85. At this point, low pressure chamber 85 will already have been sealed by virtue of the piston having just closed the exhaust valve 84 which is then held closed by the continuing steam pressure on its lower (inward) surface. On the down stroke, the steam will perform more expansion work while flowing from the high pressure chamber 16*b* into the greater volume of the low pressure chamber 85 as steam expands through the transfer port 92 which is held open during the inward stroke by its valve spring 98. Nearing the end of the inward stroke, steam pressure on exhaust valve 84 drops sufficiently to enable the spring force selected for spring 84*a* to open valve 84 at the optimum release point in the cycle somewhat before the end of the inward stroke e.g., about 36° before BDC.

In this way, the higher efficiency advantages of a double acting compound engine are obtained in a compact structure without the requirements for transfer pipes, cam shafts or cams while also having the further higher efficiency advantages of the zero clearance with zero compression operating cycle (Z-Z cycle) disclosed herein and in prior related application Ser. No. 12/959,025, now U.S. Pat. No. 8,448,440. Moreover, expansion work can be performed in two successive expansion stages that allow greater total expansion of steam within the same cylinder 74 for an increase in total work output using a single piston and cylinder for both expansion strokes of each complete cycle instead of two separated cylinders and pistons for two expansions. The invention performs each double expansion cycle with a single piston. In addition, the absence of traditional transfer pipes or receiver between high and low pressure cylinders eliminates heat loss and flow restriction found in a standard double expansion engine. Although cutoff varies as the time interval required for steam to equilibrate pressure across valve 28' without adjusting for RPM, valid cutoff control can be obtained. For example, a commercially available electronic engine control unit (ECU) programmed to optimize brake specific fuel consumption (BSFC) can be coupled to set the angle A of cam 57 and needle 54 at whatever position provides the best results while the engine runs at any variable speed or load using instantaneous cutoff—BSFC input control exclusively or together with rule based control grounded on Rankine operation mapping when advantageous.

Figure 4:
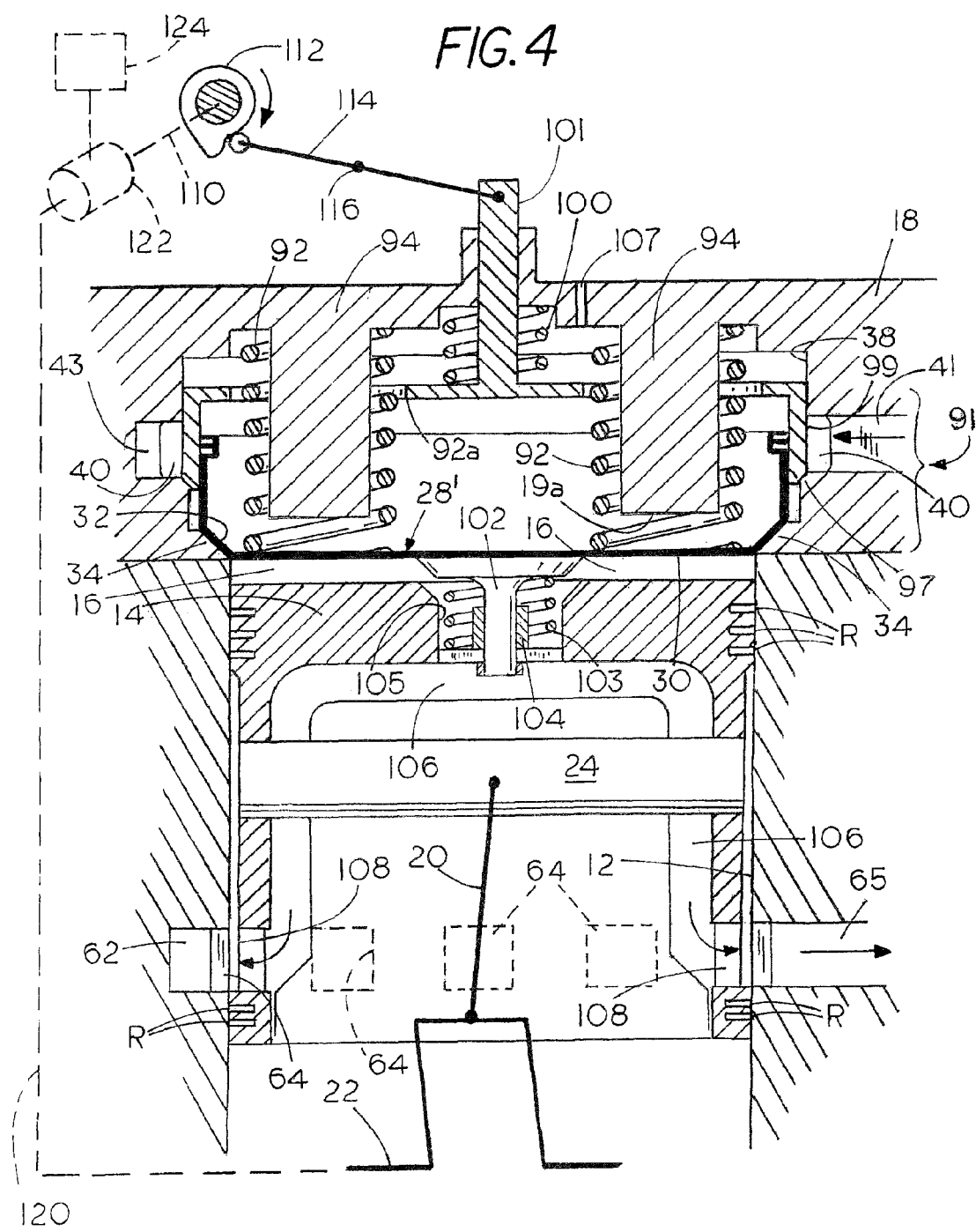
FIG. 4 is a diagrammatic vertical sectional view showing an application of the invention in a duplex steam inlet valve.

Refer now to FIG. 4 wherein the same numbers refer to corresponding parts in other Figures. The pressure differential control by needle 54 across the steam inlet valve described above in connection with FIGS. 2 and 3 provides outstanding results in establishing a selected cutoff and increasing cutoffs at higher RPMs. However, in some cases, control over a wider range or precise computerized control under variable operating conditions is desired. To fulfill these requirements, the invention as shown in FIG. 4 which illustrates an engine with a second valve element in series with inlet valve 28' so as to provide the advantages of the inlet valves described in the previous embodiments together with additional versatility during variable, unusual or abnormal operating conditions.

FIG. 4 illustrates how the invention can be applied to a single stage steam engine having an inlet valve indicated generally by the bracket 91. A patelliform inlet valve body 28' generally as described in FIG. 3 is mounted for axial sliding movement within the head 18 and is yieldably biased to a seated position on valve seat 34 by four compression springs 92 each surrounding a fixed stop 94 (only two pairs being shown) arranged in a circle around the cylinder axis, and each passing through an opening 92*a* in the top wall of a sleeve valve element 99 in head 18. No aperture is needed at the center of inlet valve 28'.

Outwardly of the seat 34 is a concentric second valve seat 97 that is sealed, as shown, by an annular valve surface at the lower edge of the sleeve valve element 99 which is slideably mounted in the bore 38 as well as being slideably and sealingly mounted over the valve body 28' and yieldably biased inwardly to a seated position by a compression spring 100 surrounding its valve stem 101. Sleeve valve 99 seals the steam supply pipe 41 which carries steam to a circular manifold channel 43 surrounding both inlet valve body 28' and sleeve valve element 99. Channel 43 communicates with bore 38 through several spaced ports 40. It can be seen that the valve seats 34 and 97 are concentric and are axially as well as radially displaced from one another so that the duplex valve 91 thus formed will only be open when both of the series related valve elements 28' and 99 are unseated and only then allow steam to flow from the steam supply pipe 41 and circular steam manifold channel 43 into the steam chamber 16.

To exhaust steam, the piston 14 in this embodiment is provided with a poppet valve 102 in the piston head as in FIG. 3 except that it opens outwardly. Valve 102 is slideably supported in a guide 104 which is held on radial struts in the center of a passage 105 through the piston head so that when open, steam can flow from the expansion chamber 16 through the passage 105 into a chamber 106 on the interior wall of the piston 14, then through circumferentially distributed openings 108 and finally through ports 64 in the cylinder into the low pressure manifold 62 and exhaust pipe 65 to atmosphere or to a condenser (not shown) for recycling the steam in a closed circuit. Rings R at the bottom of the piston prevent low pressure steam from entering the crankcase of the engine. The bore 38 holding valve 99 can be vented to atmosphere at 107. In the case where a straight line motion mechanism is used such as a piston rod and crosshead or Lanchester crank (each not shown), the crankcase can be isolated from the cylinder block by an oil seal packing (not shown) and the lower set of rings R at the bottom of the piston skirt can be eliminated.

The sleeve valve actuator of the engine of FIG. 4 will now be described. Slightly before the piston reaches the top center position, e.g. about 10 degrees in advance, rotation of a camshaft 110 which is geared to crankshaft 22 will cause a spiral cam surface of a cam 112 to pivot a valve rocker 114 counterclockwise about pivot 116 so as to raise the sleeve valve 99 from seat 97 thereby opening the high pressure steam apertures 40 in the bore 38 but no steam will flow since valve 28' remains seated. It can be seen that as the spiral cam 112 rotates, sleeve valve element 99 will be retracted slowly but will close abruptly when the rocker 114 reaches the outer end of the spiral thereby providing cutoff with an abrupt closing action.

During operation of the engine in FIG. 4, at the beginning of a cycle with the piston moving outwardly and exhaust valve 102 in an open position, steam will flow from chamber 16 through valve 102 down through the chamber 106 within the piston then through ports 64 and out through exhaust pipe 65 until the top of the exhaust valve 102 contacts the end wall 30 of the steam inlet valve body 28' whereupon the exhaust valve 102 will begin to close due to its engagement with valve 28' causing complete closure of the exhaust valve proximate the instant the top of the piston contacts the inlet valve 28' so as to apply a bump force under conditions of zero clearance. The final upward movement of the piston then raises the inlet valve 28' off the seat 34. Even a minute lift, such as 0.005 inch, is sufficient as the piston is about to reach TDC. As soon as the steam is able to enter the cylinder past the seat 34, the sudden burst of steam introduced between the top of the piston and the inlet valve will almost instantly drive the valve body 28' outward by applying a steam pressure assist to the fully open position seated against the stops 94. Unlike a conventional harmonic valve, the valve 28' springs open in only a few milliseconds against the closing force of springs 92. The series related valve elements 28' and 99 are independently moveable and operate to prevent the admission of steam when either is in a seated position. The rapid valve action enables the invention to increase work output and reduce fuel consumption.

With sleeve valve 99 now open and valve 28' having been previously opened, high pressure steam at substantially supply pressure will fill the expansion chamber 16 until the appropriate moment for the steam cutoff which is accomplished by closing valve element 99 at the time selected through an operative connection indicated by a dashed line 120 between the crankshaft 22 and a phase regulator 122 under the control of the operator using a lever or dial (not shown) on regulator 122 that can be turned manually or by an electronic controller 124 such as an electronic engine management computer of suitable known construction as described in a parent application Ser. No. 12/075,042, now U.S. Pat. No. 7,997,080, Ser. No. 12/387,113, now U.S. Pat. No. 8,109,097 or in application Ser. No. 12/959,025, now U.S. Pat. No. 8,448,440 so as to regulate the steam cutoff as a fraction of the power stroke for optimizing thermal efficiency or providing greater power as the need arises during operation.

Valve 28' is thus opened by a bump force applied to it by the piston always at the same time in the cycle proximate TDC. The closing of sleeve valve 99 is however variably and controllably related to the crankshaft position. Rather than changing with engine speed, steam cutoff as a fraction of the stroke in FIG. 4 is determined solely by the time interval between the opening of valve body 28' and closing of sleeve 99 due to the lag set by phase regulator 122 relative to a null point on crankshaft 22 and the phase is in turn selected by engine controller 124 or by the operator. Adjustment of the phase regulator 122 is therefore able to precisely time the closing of sleeve 99 so as to vary the cutoff of steam entering chamber 16 as the need arises regardless of RPM variations, because the cutoff obtained is not a function of time (the time required for a fluid such as steam to flow through a selected orifice) as in FIG. 3, but instead varies with RPM it is possible to optimization efficiency directly under changing operating conditions.

There are two stages to the biphasic exhaust function. The first stage occurs when the top of the piston is located at the BDC position just below the exhaust ports 64 enabling cylinder pressure to drop to ambient or condenser pressure. This pressure drop will start the second stage by causing valve exhaust 102 to open unless its spring 103 has been selected to release remaining steam at a somewhat higher pressure. In either case during virtually the entire upward return stroke of the piston to the TDC position, exhaust valve 102 is held open by spring 103 allowing steam in chamber 16 to drop to ambient pressure as it flows through the chamber 106 in the piston and finally out through exhaust pipe 65.

It should be noted that in FIGS. 3 and 4, the exposed face of inlet valve wall 30 covers all or substantially the entire cross-sectional area of the cylinder and that its contact with the piston results in a clearance of zero in the steam expansion chamber 16 while there is simultaneously little, if any, compression of residual steam remaining in the cylinder. In this way it is possible to achieve the higher efficiency characterizing the zero clearance with zero compression or Z-Z operating principle of the present invention.

Figure 5:
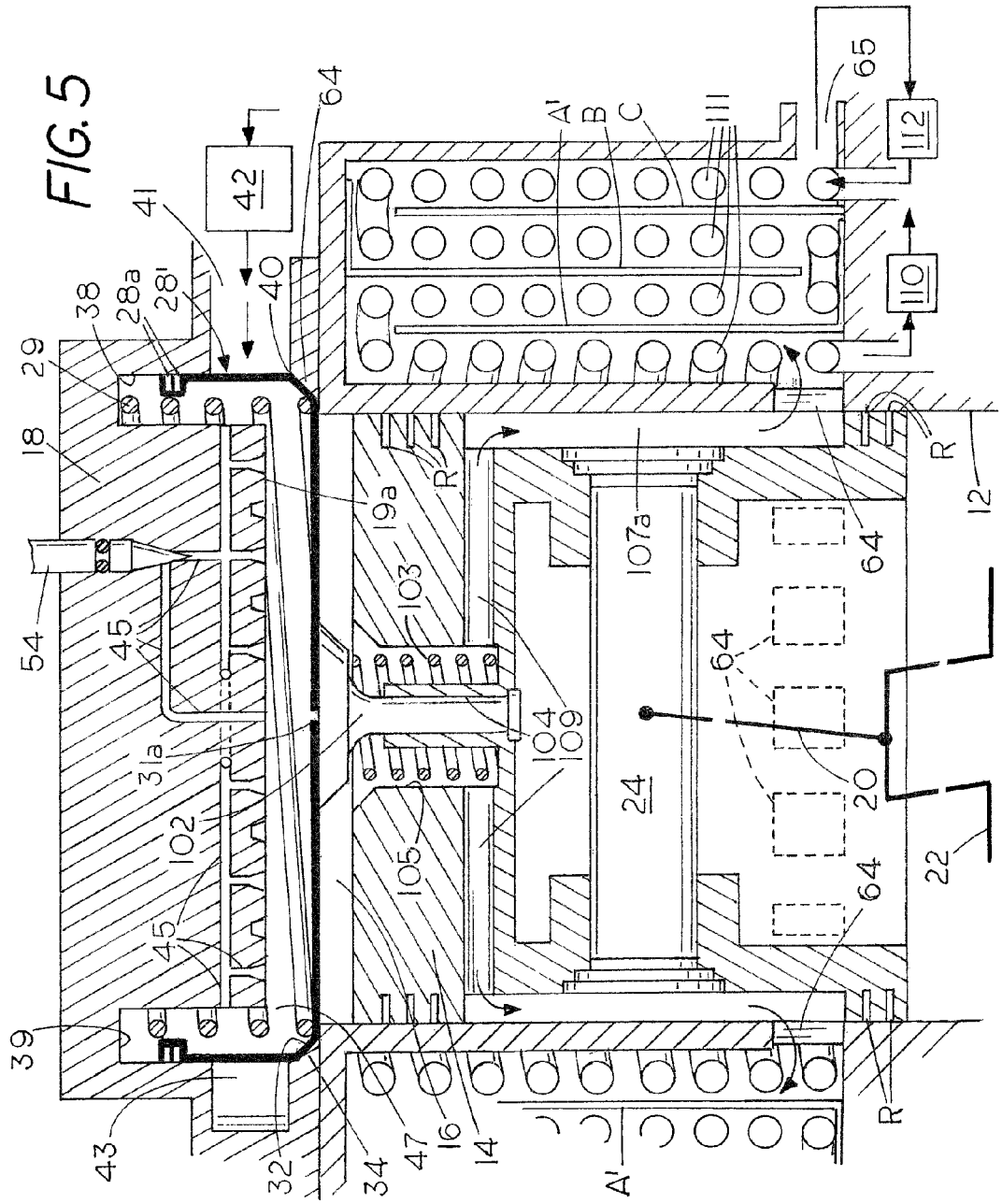
FIG. 5 is a diagrammatic vertical sectional view of a form of the engine wherein exhaust passes downwardly through a valve in the head of the piston.

Refer now to FIG. 5 illustrating a single expansion steam engine in which exhaust steam is removed through an exhaust valve 102 in the piston head as described concerning FIG. 4. Accordingly, there is no exhaust passage 19 through the head 18. The valve body 28' is the same as described above in FIGS. 2 and 3. Exhaust valve 102 and piston 14 are substantially as described in FIG. 4.

During operation, as the piston 14 of FIG. 5 approaches TDC, spring 103 which has a lower biasing force than that of inlet spring 29, allows exhaust valve 102 to close at or before the opening of inlet valve body 28' through a piston applied bump force during the final movement, e.g. 0.005 in. of piston 14 so as to lift the inlet valve body 28' slightly off the seat 34. Assuming supply steam at 500 psi, a lifting force typically of about 1000 lbs. is then exerted against the tapered closure surface 34 of the inlet valve body 28' propelling the inlet valve fully open abutting the stop surface 19a with port 31a aligned over the mouth of steam passage 45. Then as the high pressure steam flows past the needle 54 at the rate selected by opening or closing the needle, the pressure in chamber 47 rises until spring 29 is able to close the inlet valve body 28' thereby establishing optimum cutoff of supply steam that was set, selected or determined by an electronic engine controller as described hereinabove. The piston then continues through the remainder of the power stroke until the cylinder pressure in chamber 16 drops to the level desired for release set by spring 103 which then opens the supplemental exhaust valve 102 and holds it open throughout substantially the entire remaining exhaust stroke as in FIG. 4. It will be noted that relatively cool low pressure exhaust steam has little opportunity to chill incoming steam. As the entire piston drops below the exhaust ports 64, cylinder pressure will fall to ambient and the exhaust valve 102 will open if not already open. The exhaust valve 102 then remains open during the upstroke in a second phase of the exhaust process during which residual steam flows out through exhaust valve 102 so that there is little if any compression of residual steam when the zero clearance condition is reached as the valve body 28' and the piston come into contact. The piston outer diameter is reduced as shown between the rings R at each end to form a peripheral longitudinally extending passage 107a communicating between the exhaust valve 102 through six ports 109 and the outlet ports 64 in the cylinder wall carrying steam into countercurrent heat exchange relationship with four concentric coils of a steam line 111 that are nested within one another and separated by concentric circular baffles A', B and C. Steam enters the coils 111 from a condenser 112 as shown by a vertical arrow and after being reheated by the countercurrent flow of the steam exhaust out of ports 64. It then flows to heater 110 such as a fuel burner or a chamber where it is further heated by engine combustion exhaust gas before reentering the engine cylinder from the steam supply 42 in a closed circuit.

Figure 6:
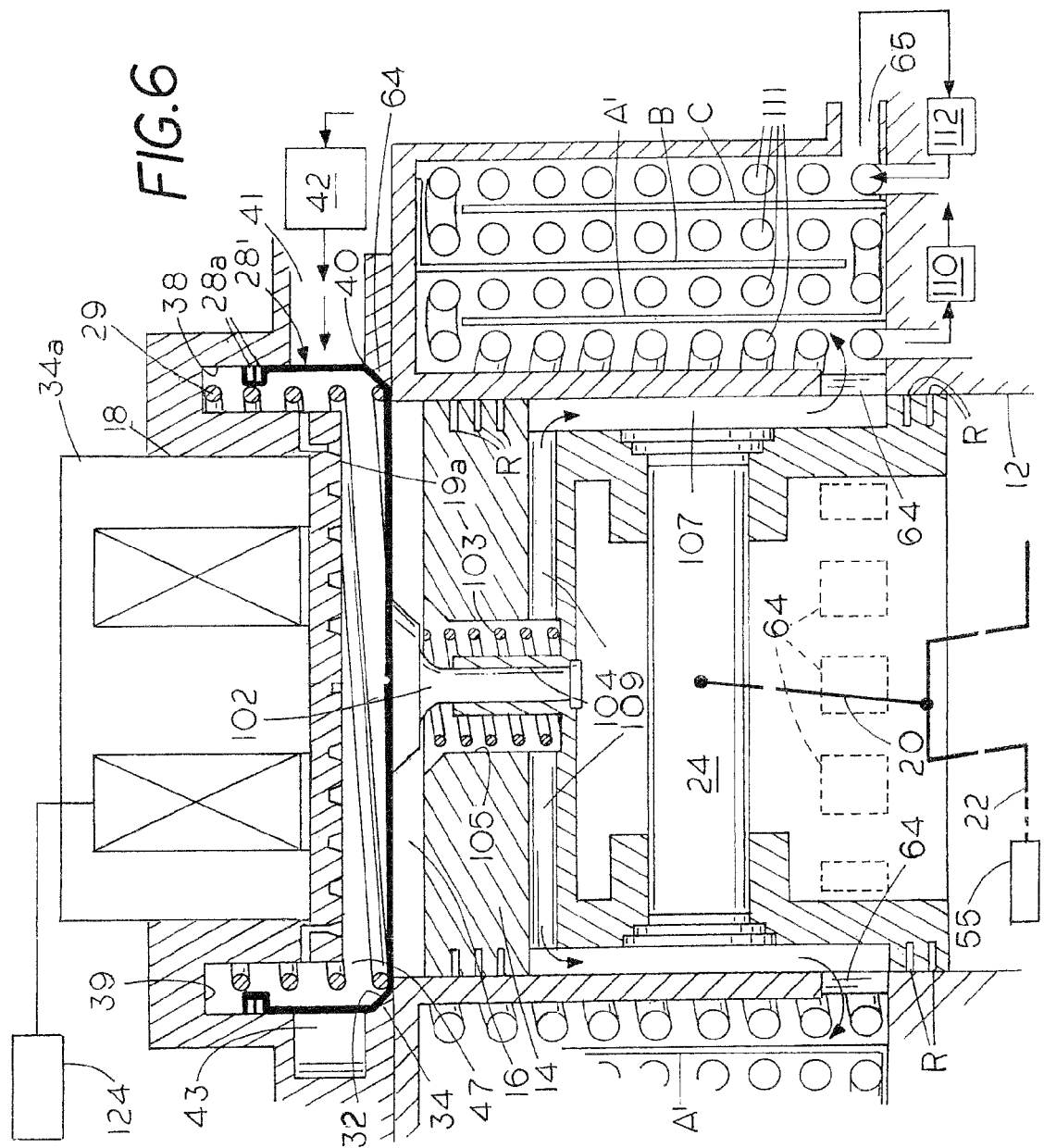
FIG. 6 is a view similar to FIG. 5 showing a modified form of inlet valve assembly as described in accordance with the invention.

Refer now to FIG. 6 wherein the same numerals refer to corresponding parts in FIG. 5 and in other figures. FIG. 6 illustrates a modified form of inlet valve assembly in accordance with the present invention as disclosed hereinabove and in our prior copending Application Ser. No. 12/959,025 filed Dec. 2, 2010, which has been incorporated herein by reference. FIG. 6 is generally similar to FIG. 5 and includes an inlet valve body 28' that can be opened either automatically responsive to piston contact or in this case electrically by means of a solenoid 34a. The solenoid 34a produces an intermittent magnetic field for operating inlet valve body 28' of each cylinder with further efficiency. The electric solenoid 34a is mounted above inlet valve body 28' concentric within the valve timing chamber 47 so that when actuated by a suitable electrical power supply the solenoid will provide an intermittent magnetic field for opening the valve body 28' at precisely timed intervals for starting or, if desired, for running. The inlet valve 28' is thus able to be opened automatically responsive to contact by the piston 14 as in FIG. 5 or it can be operated electrically by means of the solenoid 34a. The electronic controller 124 (FIGS. 4 and 6) such as an electronic engine management computer of suitable known construction as described above and is also as described in application Ser. No. 12/959,025 for regulating the steam cutoff as a fraction of the power stroke to optimize thermal efficiency or for providing greater power as the need arises during operation. The engine controller 124 can operate continuously throughout operation to control the steam cutoff for optimizing efficiency under changing operating conditions as noted above. The engine of FIG. 6 can be started by an electric starter motor designated 55 or if desired by means of the electrical solenoid 34a. Solenoid 34a can also operate the inlet valve body 28' while the engine is running. Operation then continues as described above in connection with FIG. 5.

Figure 7:
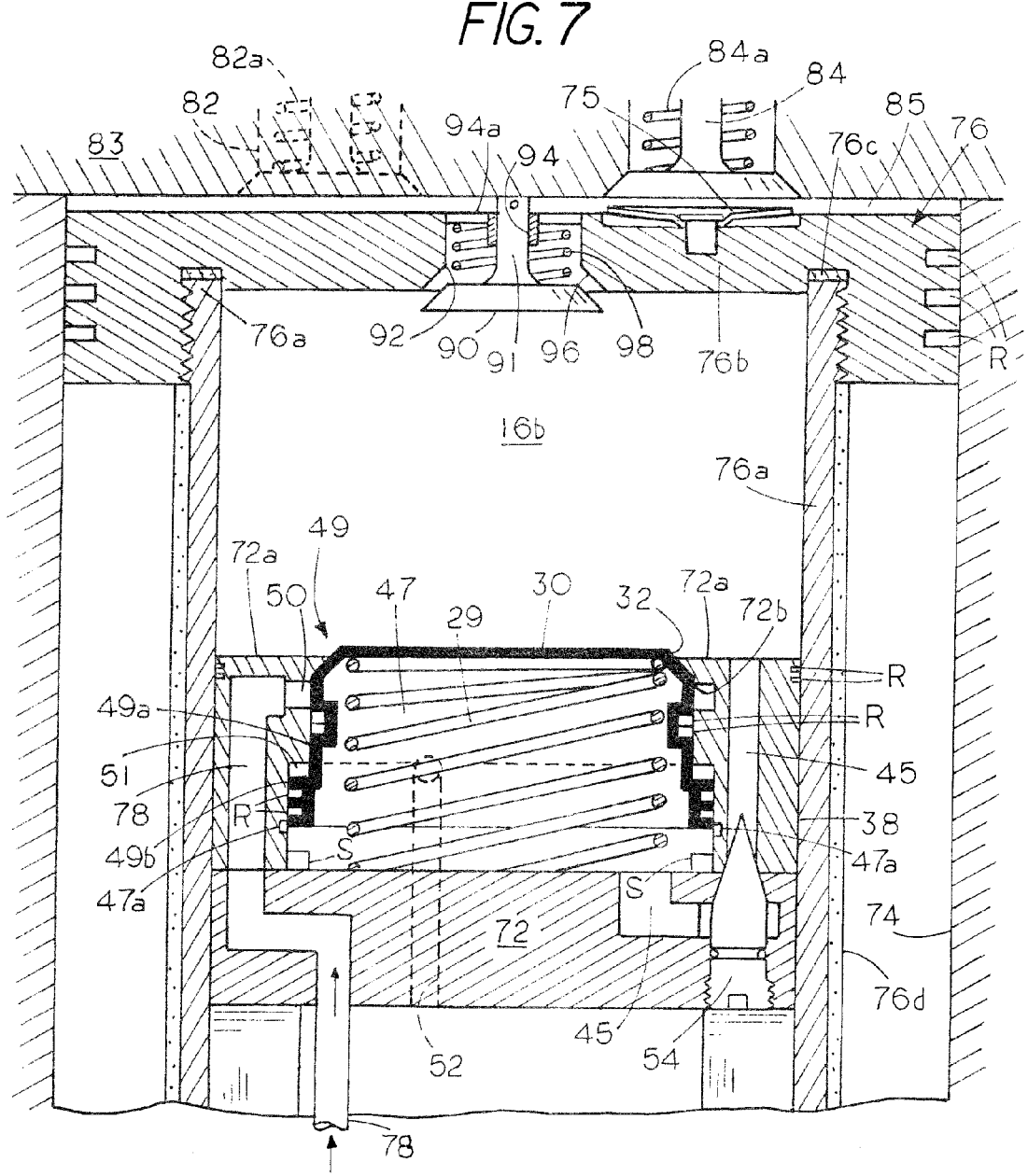
FIG. 7 is a view of the invention similar to FIG. 3 inlet valve with a modified form of valve body.

Refer now to FIG. 7 which illustrates a steam inlet valve and cutoff control constructed to significantly reduce the closing force required of the valve closing spring and therefore the work required in opening the inlet valve.

The engine is generally similar to FIG. 3 except for the inlet valve body or piston designated 49 which has a selected first diameter section 49a closest to the high pressure steam expansion chamber 16b and a somewhat larger diameter section 49b at its free edge within cutoff control chamber 47. Each of the sections 49a and 49b are sealed by compression rings shown (e.g., at R) within coaxial bore holes within the inward cylinder head 72 that are ground to provide a sliding fit for each of sections 49a and 49b. An empty annular space 51, the volume of which varies during operation is vented to a sump at atmospheric pressure through a duct 52. When valve 49 becomes seated as shown, pressure in chamber 47 can be vented by several vent ports 47a connected to the vent duct 52 leading to the sump (not shown).

Spring 29 normally holds the valve piston 49 in a closed position as shown with its tapered valve closure surface 32 in contact with valve seat 72b so that high pressure steam supplied through duct 78 and counter bore 50 is prevented from entering the steam expansion chamber 16b. Proximate TDC valve 28' is lowered off seat 72h by piston head 76b and valve 90.

The cutoff of steam supplied to the high pressure steam expansion chamber 16b as a fraction of the power stroke is controlled by the setting of a threaded cutoff timing needle valve 54 which regulates the rate steam is able to flow from the chamber 16b to timing control chamber 47. Thus, if the needle is opened more, the cutoff is earlier in the power stroke.

During operation when the inward surface of the piston head 76b moves valve 49 slightly, e.g., 0.030 inch, valve surface 30 contacts the head 76b and valve 90 throughout leaving no clearance space at all that is surrounded by ring having a clearance typically of about 0.020 inch. Steam is then injected across the valve seat 72b almost instantly driving the valve piston 49 to a fully open position against stops S during the power stroke of high pressure chamber 16b until the pressure rise in the timing chamber 47 responsive to the setting of the valve 54 exceeds the downward force on valve piston 49 thereby seating valve 49 so as to cutoff the steam supply to chamber 16b at the time selected. Thus, for example, assuming steam is supplied at 100 psi and the diameters of sections 49a and 49b are 2 inches and 2.5 inches respectively, the downward force on valve 49 will initially be 314 lbs. but when axial pressure is equalized on both upper and lower sides of the valve piston 49, the upward force will 490 lbs. or a net force of 176 lbs. directed upwardly. In this way the inlet valve body or piston has a different diameter section at each end for moving it almost entirely by steam pressure in opposite directions between open and closed positions. This allows a light spring 29 of for example 25 lbs. force to be used. Consequently a less expensive spring can be used and valve work is reduced thereby further increasing operating efficiency.

EXAMPLE

Figure 8:
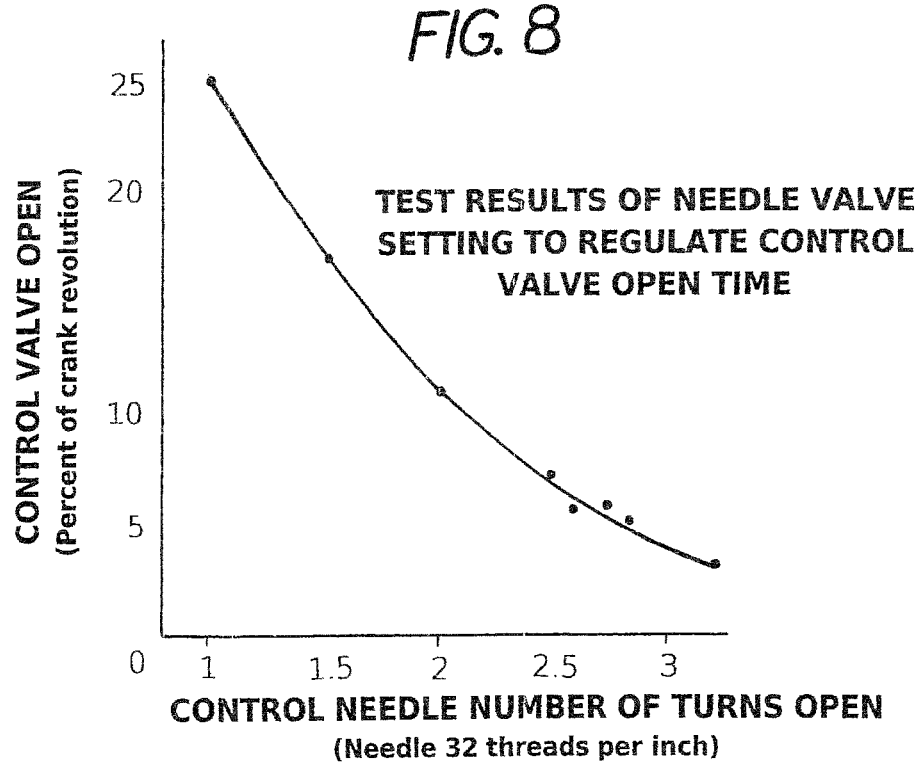
FIG. 8 is a graph showing engine test results in timing a reciprocating inlet control valve responsive to the setting of a metering needle valve as shown in FIGS. 3, 5 and 7.

Refer now to FIG. 8 which shows the results of several test runs carried out using compressed air at 130 psi with a control valve test article similar to inlet valve body 28' of FIGS. 3-6 that had an OD of 2.5 inches. The size of the timing needle and relative size of the control chamber 47 inside the valve body were proportioned to have the valve open and then close in less than one rotation of the crank. The graph demonstrates how the faction of each cycle for the valve body to remain open was controlled almost linearly during the test using various needle valve settings. The tests also showed the inlet valve opening time to be from 1 to 2.5 milliseconds which is substantially less than the range of ⅓ to ¼ stroke for an eccentric actuated valve.

What is claimed is:
1. A steam engine comprising:
a cylinder head and an engine cylinder with a working piston therein;
a steam inlet valve comprising a poppet piston sealingly and slideably mounted in the engine cylinder head and communicating with a steam expansion chamber in the engine cylinder containing the working piston;

wherein the steam engine has a steam inlet communicating between the steam expansion chamber when a closure surface of the poppet piston is moved at least partially open to thereby apply steam pressure from a steam supply source via at least one duct to the poppet piston that forces the poppet piston to a fully open position for admitting steam into the expansion chamber; and wherein the poppet piston has two ends with a different diameter section at each end thereof for moving the poppet piston in opposite directions along a path extending between open and closed positions by a force caused by the steam pressure provided to the two ends of the poppet piston.

2. The steam engine of claim of claim 1, wherein the steam engine is a double expansion steam engine wherein exhaust steam is discharged from the steam expander and then is fed to a lower pressure steam chamber in the engine cylinder to extract an amount of work therefrom.

3. A compound steam engine comprising:

at least one cylinder having a cylindrical inner surface and an outward cylinder head mounted on an outward end thereof and an inward cylinder head mounted concentrically within the cylinder and spaced radially from the cylindrical inner surface of the cylinder;

a piston operatively connected to a crankshaft, the piston being slideably and sealingly engaged between the outward cylinder head and the inward head so as to define a relatively high pressure steam expansion chamber between a head of the piston and the inward cylinder head, the engine having a lower pressure steam expansion chamber between the piston and the outward cylinder head;

a steam inlet valve for injecting pressurized steam through the inward cylinder head into the high pressure expansion chamber;

a steam exhaust valve communicating with the lower pressure expansion chamber for exhausting steam from the engine; and a transfer valve body mounted in the piston for moving along a path between an open position and a closed position in response to motion imparted thereto by an interior engine surface facing the lower pressure expansion chamber and confronting the transfer valve as the piston moves the transfer valve body to a location proximate the interior engine surface.

4. The compound steam engine of claim 3, wherein the steam inlet valve comprises a steam inlet valve body mounted in the inward cylinder head for movement between open and closed positions responsive to motion imparted thereto by a movement of the piston.

5. The compound steam engine of claim 3, wherein the steam exhaust valve comprises a steam exhaust valve body mounted in communication with the lower pressure chamber for movement between open and closed positions responsive to motion imparted thereto by a movement of the piston.

6. A steam engine comprising:

at least one engine cylinder having a cylinder head;

a piston slideably and sealingly mounted in the engine cylinder and operatively connected to a crankshaft;

a poppet piston steam inlet valve slideably mounted in a valve control chamber within in the engine for movement between an open position and a closed position on a valve seat at one end of the valve control chamber, the valve seat communicating with a steam expansion chamber in the engine cylinder;

a passage connected to the valve control chamber to convey steam from a steam supply source to a portion of the valve control chamber proximate the valve seat;

a flow control passage connected to the valve control chamber having a metering valve to establish the flow of steam at a selected rate from the expansion chamber to the valve control chamber; and the engine having at least one vent port communicating with the valve control chamber to allow the steam in the valve control chamber to be vented from the valve control chamber thereby releasing steam so as to lower pressure therein by opening the vent port when the poppet piston steam inlet valve moves to the closed position.

7. The steam engine of claim 6, wherein the poppet piston steam inlet valve has a face confronting the piston and the poppet piston steam inlet valve is constructed and arranged to be partially opened by movement of the piston to a position proximate the face of the poppet piston steam inlet valve and then be opened further to a fully open position by a steam assist force of the steam entering the expansion chamber that is applied to the face of the poppet piston steam inlet valve so as to impart motion thereto.

8. A steam engine comprising:

at least one engine cylinder having inward and outward steam cylinder heads and a piston slideably and sealingly mounted in the at least one engine cylinder at one end of a steam expansion chamber therein with an operative connection between the piston and a crankshaft for imparting rotation to the crankshaft;

wherein the piston has a sleeve slideably and sealingly mounted over the inward steam cylinder head;

a steam inlet valve having a steam inlet valve body that is mounted in a bore in the inward steam cylinder head and having an end face located on a wall of the expansion chamber confronting the piston;

wherein the steam inlet valve body is a poppet piston having a valve closure surface thereon proximate a free end thereof for sealing a valve seat in the engine adjacent a port that communicates between the bore in the inward steam cylinder head and the expansion chamber;

wherein the engine has at least one steam inlet passage therein communicating with the bore such that steam from a steam supply source is able to enter the bore in the inward steam cylinder head through the at least one steam inlet passage and then flow into the steam chamber through the port when the steam inlet valve body is raised off the valve seat;

a low-pressure steam expansion chamber within the at least one engine cylinder between a head of the piston and the outward steam cylinder head;

a reciprocating steam exhaust valve for discharging exhaust steam from the low-pressure steam expansion chamber;

a steam exhaust valve closer for shutting the steam exhaust valve when the piston reaches a position proximate the outward cylinder head whereby steam is exhausted from the low-pressure expansion chamber of the engine during an exhaust stroke to thereby reduce compression of residual steam remaining in the expansion chamber between the piston and the outward cylinder head;

a surface of the piston and a confronting end of the expansion chamber both being contoured to conform to one another to minimize a clearance in the at least one engine cylinder as an opening force is generated by a piston motion to open the steam inlet valve;

wherein the operative connection provided between the piston and the crankshaft establishes a clearance between the piston and the inward steam cylinder head to be at a minimum during a transition of discharging exhaust steam out of the high-pressure expansion chamber to admit steam into the low-pressure expansion chamber and a transfer valve through the piston head, wherein the transfer valve is held closed by steam pressure and is actuated by a motion of the piston to convey steam from the expansion chamber to the low-pressure steam chamber.

9. The steam engine of claim 8, wherein the poppet piston of the steam inlet valve is sealingly mounted in the bore, wherein when the steam inlet valve is opened, the steam is able to pass through the inlet passage so as to produce an opening force on the steam inlet valve body for providing a steam power assist which exceeds a yieldable bias on the steam inlet valve, the steam power assist thereby driving the steam inlet valve body to a more fully open position; and wherein the steam inlet valve body is a piston that has a different diameter section at each end thereof for being moved by steam pressure from an open position to a closed position.

10. The steam engine of claim 9, wherein the yieldable bias on the steam inlet valve body is provided by a spring that exerts a closing force on the steam inlet valve body.

11. The steam engine of claim 8, wherein the steam inlet valve comprises a patelliform poppet piston valve body and the end face thereof is a wall positioned for being opened through a motion of the piston or with a lifter on the piston or on the wall portion by the said opening force, an end wall portion of the steam inlet valve body comprises a part of a wall of the low-pressure expansion chamber which has a periphery that is spaced centrally from an outer edge of the inward steam cylinder head by a ring portion of the inward steam cylinder head wherein the width of the ring is less than the diameter of the end face portion of the steam inlet valve.

12. The steam engine of claim 8, wherein an annular inlet valve seat of the engine is positioned so as to be surrounded by a ring portion of the inward steam cylinder head that is located between the steam inlet valve body, a wall of the cylinder and the ring portion of the inward steam cylinder head supports the annular inlet valve seat therein and an entire area of the inlet valve facing an inward surface of the head of the piston comes into contact with the piston head or the transfer valve for applying a bump force to open the steam inlet valve body.

13. The steam engine of claim 8, wherein the steam inlet valve has a broad surface on a free end thereof forming over half of the diameter of one end of the expansion chamber and said broad surface is brought into contact with the piston when the opening force is applied to open the steam inlet valve for establishing a zero clearance therebetween.

14. The steam engine of claim 8, wherein the steam inlet valve is yieldably biased by a spring toward the expansion chamber and onto the valve seat;

the operative connection is a piston rod constructed and arranged to partially elevate the inlet valve off of the valve seat when the piston is proximate a dead center position; and as the steam inlet valve is partially elevated pressurized steam from the steam supply source is caused to enter a portion of the bore between the steam inlet valve body and the piston to produce a steam power assist force on the steam inlet valve body sufficient to further open the steam inlet valve and compress a valve spring biasing the steam inlet valve.

15. The steam engine of claim 8, wherein the steam exhaust valve has a steam exhaust valve opener for keeping the steam exhaust valve open proximate an end of an exhaust stroke therethrough whereby little or no work is consumed in the recompression of residual steam such that the engine is thereby indicated to operate in accordance with the formula $$\eta_{ZZ} = \text{Cycle Efficiency} = \frac{\text{Work}_{NET}}{m\Delta h} = \frac{P_T}{\rho_s x \Delta h}\left[\frac{xn - x^n}{n-1} - \frac{P_A}{P_T}\right].$$

16. A compound steam engine comprising:

an inward cylinder head and a cylinder with a working piston therein;

a steam inlet valve comprising a poppet piston valve body sealingly and slideably mounted in the engine to communicate with a steam expansion chamber in the cylinder at one end of the expansion chamber;

wherein the steam inlet valve is constructed to open when moved axially in a direction away from the steam expansion chamber;

a steam inlet of the compound steam engine communicating through the steam inlet valve, with the steam expansion chamber when a closure surface of the poppet piston valve body is partially raised to an open position to thereby apply steam pressure from a steam supply source to the poppet piston valve body that lifts the poppet piston valve body to a fully open position for admitting steam into the expansion chamber;

wherein the working piston is slideably and sealingly mounted within the cylinder and is slideably and sealing mounted over the inward cylinder head which has the steam inlet valve therein;

wherein a transfer valve is yieldably mounted in the piston for being actuated by engaging a stationary part of the engine;

wherein the steam expansion chamber is a high-pressure steam chamber located within the piston between a head of the piston and the inward cylinder head;

wherein an external cylinder head is mounted on the cylinder outwardly of the piston to define a low-pressure steam expansion chamber in the cylinder for extracting an amount of work during a second expansion of steam that is transferred thereto from the high-pressure steam chamber; and wherein a low-pressure steam exhaust valve communicates with the low-pressure steam expansion chamber for discharging the exhaust steam from the engine.

17. The compound steam engine of claim 16, wherein the working piston is a mushroom shaped piston having an enlarged head at one end supporting circumferentially extending compression rings;

wherein the working piston has a sleeve portion of a smaller diameter than the piston head defining the high-pressure steam expansion chamber therein; and wherein at least one connector provides an operative relationship between the piston and a crankshaft.

18. The compound steam engine of claim 16, wherein the working piston has a sleeve with an external reinforcing wrap comprising a filament or a wire wound thereon.

19. The compound steam engine of claim 16,
wherein the steam inlet valve poppet piston is sealingly mounted within the bore such that upon being partially opened the steam from the steam supply source thereby provides a steam power assist to further open and hold open the steam inlet valve.

20. The compound steam engine of claim 16,
wherein a valve control chamber is provided in the inward cylinder head at an end of the steam inlet valve opposite the face thereof; and
wherein a steam flow control sets a rate steam flows from a steam supply source into the valve control chamber to establish a period of time that the steam inlet valve remains open thereby regulating a cutoff of steam supplied by the steam inlet valve to the high-pressure steam expansion chamber during a power stroke of the engine.

21. The compound steam engine of claim 16, wherein the steam that is transferred to a low-pressure steam expansion chamber passes through the transfer valve in the piston, the transfer valve has a poppet valve body which is yieldably biased inwardly and includes a valve stem with a free end facing the external cylinder head that opens the transfer valve by motion imparted thereto by movement of the piston to a position proximate the external cylinder head.

22. A steam engine comprising:
at least one engine cylinder having a working piston slideably and sealingly mounted therein an inward cylinder head fixed in radially spaced relationship within the at least one engine cylinder and a high-pressure steam expansion chamber between the piston and the inward cylinder head;
wherein the working piston has a piston head of a first diameter that is slideably and sealingly engaged with the cylinder and an internal cylindrical surface of a second smaller diameter slideably and sealingly mounted over the inward cylinder head;
wherein the working piston is operatively related to the crankshaft for imparting rotation to the crankshaft;
a steam inlet valve having a steam inlet valve body yieldably mounted within a bore in the inward cylinder head so as to reciprocate therein while the steam engine is operating, which is biased onto a valve seat in the inward cylinder head and has a face at a free end that is positioned to confront the working piston for being opened by movement of the working piston when the working piston is proximate thereto;
wherein the steam inlet valve body is a piston valve having a valve closure surface thereon operatively related for opening and closing a port in the inward cylinder head that communicates with the high-pressure expansion chamber;
at least one steam admission inlet communicating with the steam inlet valve body such that steam is supplied from a steam supply source and is able to flow into the high-pressure steam chamber through the inlet and through the port in the inward cylinder head when the steam inlet valve body is moved to an open position;
an external cylinder head is mounted on the cylinder outwardly of the working piston to define a low-pressure steam expansion chamber in the cylinder outwardly of the working piston for further expanding steam transferred thereto from the high-pressure steam chamber;
the engine having a passage with a transfer valve body movably and yieldably associated therewith for transferring steam from the high-pressure chamber to the low-pressure steam expansion chamber; and
a low-pressure steam exhaust valve communicating with the low-pressure steam expansion chamber for ejecting spent steam therefrom.

23. The steam engine of claim 22,
wherein the transfer valve and passage convey steam from the high-pressure chamber through a head of the working piston to the low-pressure chamber; and
wherein at least one of said valves selected from said low-pressure steam exhaust valve and said transfer valve body is actuated by an opening force applied thereto by piston movement.

24. The steam engine of claim 22, wherein the steam inlet valve body is a poppet piston slideably and sealingly mounted in the bore and the at least one steam admission inlet communicates with the bore when the poppet piston is raised off of a seat in the engine that enables the poppet piston valve body to move to an open position by an assist force applied thereto from the pressure of steam admitted into the bore through the at least one steam admission inlet.

25. A compound steam engine comprising:
at least one engine cylinder having a working piston slideably mounted therein and operatively related to a crankshaft for imparting rotation to the crankshaft;
a steam inlet valve
wherein the steam inlet valve further comprises
a poppet piston valve body that is slideably mounted within a bore in the engine and
the poppet piston valve body having a valve closure surface at one end thereof for contact with a valve seat when moved axially in the bore;
a steam expansion chamber between the working piston and the poppet piston valve body;
wherein the poppet piston valve body has a valve face on a free end thereof that confronts the working piston and forms a part of one end of the steam expansion chamber;
wherein the compound steam engine has a steam supply passage for introducing steam from a steam supply into the expansion chamber when the poppet piston valve body is raised off of the valve seat;
wherein the face on the free end of the poppet piston valve body is located to contact the working piston for establishing a zero clearance between the face of the valve body and the piston as a an opening force from working piston motion lifts the valve body off of the valve seat;
wherein the working piston is slideably and sealingly mounted within the cylinder and is slideably and sealing mounted over an inward cylinder head having the inlet valve piston therein;
wherein the steam expansion chamber is a first steam expansion chamber located within the piston between a head of the piston and the inward cylinder head;
an external cylinder head mounted on the cylinder outwardly of the working piston to define a second steam expansion chamber in the cylinder having a lower pressure than a pressure in the first chamber for extracting an amount of work during a second expansion of steam that is transferred thereto from the high-pressure steam chamber;

an automatic transfer valve in the engine that moves along an axis between an open and a closed position by a force applied to a free end of a valve stem of the transfer valve by a movement of the piston to convey steam from the first expansion chamber to the second expansion chamber and wherein a low-pressure steam exhaust valve communicates with the low-pressure chamber for ejecting spent steam from the engine.

26. The compound steam engine of claim 25, wherein the poppet piston valve body is lifted to a more fully open position by steam passing into the first steam expansion chamber from the steam supply source to raise the poppet piston valve body being raised off of the valve seat.

27. The compound steam engine of claim 25, wherein the transfer valve and the steam exhaust valve that communicates with the second steam expansion chamber are both constructed and arranged to remain open during respective ends of engine exhaust strokes therethrough until closure thereof proximate an end of each respective exhaust stroke such that compression of residual steam is reduced in the first expansion chamber and the second expansion chamber at the end of each of said respective exhaust strokes.

28. The compound steam engine of claim 25,
wherein the valve face of the inlet valve body extends across at least 75% of a diameter of the inward cylinder head; and
a contact area between the valve body and the working piston has zero clearance throughout the face of the valve body.

29. An engine comprising:
at least one cylinder having a steam cylinder head and a piston slideably and sealingly mounted in the cylinder at an end of a steam expansion chamber therein with the piston operatively connected to a crankshaft for imparting rotation to the crankshaft;
a steam inlet valve having a steam inlet valve body that is mounted in a bore in the engine and having an end face at an end of the steam expansion chamber confronting the piston;
wherein the steam inlet valve body is a poppet piston that opens when moved away from the steam expansion chamber for sealing a valve closure surface thereon proximate an end thereof onto a valve seat in the engine adjacent a port that communicates between the bore and the expansion chamber;
wherein one end of the steam inlet valve body with the valve closure surface has a selected diameter end section;
wherein a second end section of the steam inlet valve body opposite the one end has a diameter larger than the one end,
wherein the end sections each fits slideably and sealingly in coaxial bore hole portions of the bore within the engine, and the engine has at least one passage to direct pressurized steam to each end of the steam inlet valve body and the steam inlet valve body is alternately driven in opposite directions between an open position and a closed position by pressurized steam applied to the ends thereof;
wherein at least one steam inlet passage communicates with the bore for the steam inlet valve body through which steam is able to enter the bore in the engine and then flow into the steam expansion chamber through the port when the steam inlet valve body is raised off the valve seat;
an exhaust valve for exhausting steam from the engine;
an exhaust valve closer that shuts the exhaust valve proximate an end of each exhaust stroke whereby steam is exhausted from the engine to thereby reduce compression of residual steam flowing out through the exhaust valve;
wherein a surface of the piston and a confronting surface of the expansion chamber are each contoured to conform to one another such that clearance in the cylinder is minimized or eliminated as a force is applied due to piston motion to open the inlet valve and
wherein the operative connection between the piston and the crankshaft establishes any clearance between the piston and the cylinder head to be at a minimum during a transition from exhaust to steam admission.

30. The engine of claim 29, wherein the inlet valve is constructed and arranged such that when the steam inlet valve is partially opened steam passes through the inlet passage so as to produce an opening force on the steam inlet valve body that provides a steam power assist which exceeds a yieldable bias on the inlet valve thereby driving the steam inlet valve body to a more fully open position, and
the pressurized steam when applied to the larger diameter end section drives the steam inlet valve body to a closed position.

31. The engine of claim 30, wherein the yieldable bias on the inlet valve body is provided by a spring that exerts a closing force on the steam inlet valve body.

32. The engine of claim 29, wherein the steam inlet valve body has an end face positioned for being opened as a result of piston motion or by a lifter on the piston, the end face of the steam inlet valve body comprises a part of one end of the expansion chamber and the steam inlet valve body has a periphery that is spaced centrally from a cylindrical wall of the piston by a ring portion of the cylinder head.

33. The engine of claim 29, wherein the cylinder head is an inward cylinder head, the piston has a sleeve slideably and sealingly mounted over the inward cylinder head, the engine has a low pressure steam expansion chamber within the cylinder between a head of the piston and an outward steam cylinder head and a transfer valve in the piston head to convey steam from the expansion chamber to the low pressure steam chamber within the cylinder.

\* \* \* \* \*